United States Patent [19]

Weinert

[11] 4,340,616

[45] Jul. 20, 1982

[54] METHOD FOR DECREASING THE WEAR ON A SURFACE

[75] Inventor: James D. Weinert, St. Louis, Minn.

[73] Assignee: United States Steel Corporation, Pittsburgh, Pa.

[21] Appl. No.: 122,534

[22] Filed: Feb. 19, 1980

[51] Int. Cl.$^3$ ............................................... B05D 3/14
[52] U.S. Cl. ....................................... 427/47; 427/154
[58] Field of Search .................................. 427/47, 154

[56] References Cited

U.S. PATENT DOCUMENTS 2,370,636  3/1945  Carlton ................................. 427/47
3,136,650  6/1964  Avila ..................................... 427/47
3,709,730  1/1973  Tsukamoto ........................... 427/47
3,913,851  10/1975 Andersson ....................... 241/182 X Primary Examiner—Bernard D. Pianalto
Attorney, Agent, or Firm—Arthur J. Greif

[57] ABSTRACT

The wear on surfaces subject to abrasion or erosion by abrasive particles is materially reduced or eliminated by providing such surface with a magnetic attraction sufficient to hold an amount of magnetic or magnetizable particles to provide a sacrificial layer of such particles, whereby such layer acts to protect the surface lying thereunder from wear.

9 Claims, No Drawings

METHOD FOR DECREASING THE WEAR ON A SURFACE

This invention relates to a system for the treatment of abrasive particles and more particularly to a system for preventing or eliminating wear on surfaces subject to abrasion or erosion during the handling or treatment of such particles.

In the art directed to the handling of abrasive particles or slurry streams containing such particles, for example, (i) mineral processing plants employing equipment such as pumps, grinding mills, rotary mills, chutes, launders and various piping or, (ii) pipelines for conveying solids suspended in fluids such as coal-oil slurries, various surfaces of such equipment are subject to excessive wear due to the contact and erosion by such streams or slurries. To prevent such wear the art has resorted to the use of expensive liner materials such as Ni-Hard, ceramics, or tungsten chloride to provide an extremely hard and wear resistant surface in an attempt to decrease the frequency at which such surfaces have to be replaced. Alternatively, elastomeric material such as urethane and rubbers have been employed, to act as what might be termed a sacrificial surface requiring frequent replacement, but at a cost per liner significantly less than the previously noted hard, exotic-type materials. In either of such expedients, however, replacement of the liner is generally necessary—leading to additional costs incurred in purchasing the liner material, employing the manpower to install the replacement liner and losing valuable production while equipment is being relined. The instant invention overcomes these problems by providing a system capable of virtually eliminating wear, thereby eliminating the costs associated with frequent replacements. This new system utilizes a surface provided with magnetic force of sufficient magnitude to attract and hold particulate, magnetizable material thereto, whereby the particulate material itself acts as a sacrificial liner. Thus, the underlying surface itself is subject to little or no wear since it is essentially untouched by the abrasive particulate material contained in the treatment or process stream. The magnetizable particles which provide the sacrificial blanket may be inserted continuously or intermittently into the process stream to provide an automatic, self-replacing wear surface, or they may be magnetically affixed to such surface during the down-time of the equipment and replaced at regularly determined intervals. A preferred method for providing a surface having a magnetic attractive force of sufficient magnitude to hold particles thereto, is the use of sheets or strips of magnetically hard composites such as those shown in U.S. Pat. No. 3,913,851, the disclosure of which is incorporated herein by reference. That disclosure, which is also directed to the art of providing wear-resistant linings, teaches the use of such magnetic sheet composites as a means for fixing replaceable wear-resistant liners (such as those noted above) to a surface, eliminating the need for mounting by bolts, other fastening devices or adhesive bonding methods; whereby the magnetic composite material itself acts as a "glue" between the replaceable wear-resistant resilient material and the surface of the equipment itself being protected.

To prove the efficacy of the instant concept, a small diameter mild-steel pipe was lined with a commercially available flexible magnetic composite material having a thickness of 0.045 inches. A sacrificial layer composed of magnetite concentrate was affixed to the magnetic composite by coating the entire surface thereof. Thereafter, water at various velocities was passed through the pipe. Under these conditions, the magnetite concentrate provided complete protection to the underlying surface up to flow velocities of about 9 feet per second, and was not totally dislodged (thereby providing some protection), up to flow velocities of 17 feet per second. Since many of the slurry pipe lines in a typical ore processing plant utilize stream velocities in a range of about 5 to 9 feet per second, it appeared that the magnetic force provided by such flexible magnetic composite would be of sufficient magnitude, at least in many applications, to attract and hold particles and thereby provide the desired sacrificial layer. As a result thereof, a magnetic wear surface in accord with this invention was installed in a primary cyclone underflow launder of an ore concentrator. The underlying surface consisted of a 1/16" mild steel plate which was covered with a 0.045"-thick, flexible rubber composite similar to that employed in the above experiment. This particular area of the ore concentrator was selected, since it is subject to intense wear, such that prior to the instant invention this area utilized a 2"-thick Ni-Hard plate which exhibited measurable wear after a time period of the order of 100 hours. The magnetic wear surface was installed just below the discharge of the underflow box, subjecting it both to direct impact (perpendicular as well as large angle impact) of the slurry as well as providing a short distance in which the slurry travels approximately parallel to the test surface. To detect even a minor amount of wear, the magnetic composite was coated with a layer of paint. The system was tested for a period of 232 hours of operation, in which the process stream consisted of a slurry of rather coarse (90% finer than 10 mesh) abrasive particles, amounting to about 65% by weight of the total slurry stream. Upon removal of the liner for inspection after the above-noted test period, not only did the magnetic composite exhibit the complete absence of any sign of wear, but the thin paint coating was virtually untouched. It is clear therefore that the inventive system can be employed to protect virtually any surface in contact with moving abrasive materials, so long as said surface is provided with a magnetic force of sufficient magnitude to attract at least a monolayer of magnetizable particles thereto, and preferably to attract a sacrificial layer having a thickness effective to materially decrease or virtually eliminate the wear on the underlying surface.

The particulate, sacrificial layer of the instant invention can be utilized in any fluid medium containing abrasive particles wherein the weight percent of said particles are a significant fraction (generally greater than 3% and often in excess of 10%, but in any event a fraction in excess of that in which the particles are merely considered as contaminants) of the total weight of the medium and wherein the relative motion between the medium and the surface in question may cause said surface to wear. Thus, while the above description has primarily been concerned with a fluid medium traveling past a stationary surface (i.e. a process stream), it should be clear that similar principles apply to devices in which the relative motion is caused by the movement of the surface itself, e.g. a driven blade.

The particulate layer can be formed and replenished in a variety of ways. In a first embodiment, in which the abrasive treatment particles themselves contain even a small portion of magnetizable treatment particles, e.g.

as little as 0.01%, but preferably greater than about 1%, both the formation and replenishment of the sacrificial layer can be achieved in-situ, during the actual treatment of the stream. It should be understood that the term "magnetizable particles" is not limited to particles which are ferro- or even ferri-magnetic, and for purposes of this invention can include particles which either inherently exhibit an overall magnetization or which can be made so by the application of a magnetic field, and which are sufficiently magnetically hard to retain such magnetization for a requisite treatment period. In a second embodiment, more particularly applicable to the treatment of fluid media containing an insufficient amount of magnetizable, treatment particles to achieve formation of an effective, particulate layer, such layer may (i) similarly be formed in-situ, by the "continual" (i.e. continuous or intermittent) addition of non-treatment magnetizable particles to the medium or the process stream or (ii) be formed during down-time of the equipment, by coating or otherwise affixing magnetizable particles to the surface undergoing wear.

In either embodiment, it will of course be requisite that the surface be provided with a magnetic attraction of sufficient magnitude to attract an amount of particles which will provide a particulate layer of a thickness effective to materially decrease wear on such surface, especially under conditions in which the relative movement of the fluid media is likely to dislodge such particles. While external (eg. electromagnetic) magnetic fields may be employed, a preferred means for achieving such magnetic attraction is the use of a stratum of material "essentially" composed of a magnetically hard composite. While the term "composite" itself connotes a material which may also contain substances which are not magnetically hard, it should be understood that the exposed surface of such stratum need not contain any of such substances, eg. as in the above-noted experiment in which a paint film covered the composite. Thus, the term "essentially" is employed to signify a stratum which may, for example, contain a relatively thin cover layer, but which layer is of a thickness insufficient to decrease the magnetic attraction of the underlying composite to a degree by which it would not attract an effective, particulate layer.

I claim:

1. A method for decreasing the wear on a surface, due to relative movement and contact of said surface with a fluid medium of abrasive particles, the weight percent of said particles amounting to a significant part of the total weight of said medium, such contact being for a period of time and such relative movement being of a degree, sufficient to cause excessive wear on said surface, which comprises:

providing said surface, with a magnetic attraction of sufficient magnitude to attract an amount of magnetic particles which will provide a sacrificial layer thereon, consisting essentially of such magnetic particles, said layer having a thickness, (a) of at least a monolayer of such magnetic particles and (b) effective to materially decrease the wear on the surface underlying said sacrificial layer, and maintaining said magnetic attraction during said contact, whereby the particles in said sacrificial layer which are eroded or dislodged may be replenished by new magnetic particles from said fluid stream to provide said materially decreased wear.

2. The method of claim 1, wherein said fluid medium is a process stream containing abrasive treatment particles amounting to at least 3% of the weight thereof, and at least a small portion of said treatment particles exhibit a magnetizable character.

3. The method of claim 2, wherein the magnetic attraction of said underlying surface is of a magnitude which will permit the passage of virtually all the particles in said process stream except that amount necessary to continually provide said sacrificial layer.

4. The method of claim 3, wherein the magnetic attraction of said surface is provided by a stratum of material essentially composed of a magnetically hard composite.

5. The method of claim 4, wherein the magnetic attraction of the underlying surface is provided by an externally applied magnetic field.

6. The method of claim 1, wherein the amount of treatment particles in said fluid medium which exhibit a magnetizable character, is insufficient to provide an effective sacrificial layer, said method further comprising adding an amount of magnetizable, non-treatment particles in an amount at least sufficient to provide such an effective layer.

7. The method of claim 6, wherein said non-treatment particles are added in a continual manner to said fluid medium so as to form said sacrificial layer.

8. The method of claim 6, wherein said non-treatment particles are magnetically affixed to said underlying surface, prior to the introduction of said fluid medium to contact said surface.

9. The method of claim 8, wherein said surface is provided with a magnetic attraction of sufficient magnitude to prevent substantial dislodgement of such magnetizable, non-treatment particles.

* * * * *

UNITED STATES PATENT AND TRADEMARK OFFICE
CERTIFICATE OF CORRECTION

PATENT NO. : 4,340,616
DATED : July 20, 1982
INVENTOR(S) : James D. Weinert

It is certified that error appears in the above—identified patent and that said Letters Patent is hereby corrected as shown below:

Column 1, line 20, "chloride" should be -- carbides --;

Column 1, line 23, "material" should be -- materials --.

Signed and Sealed this

Twenth-eighth Day of September 1982

[SEAL]

Attest:

GERALD J. MOSSINGHOFF

Attesting Officer    Commissioner of Patents and Trademarks